June 4, 1929.  A. C. REISZ  1,715,624
SELF LOCKING TERMINAL CONNECTION
Filed Aug. 1, 1923
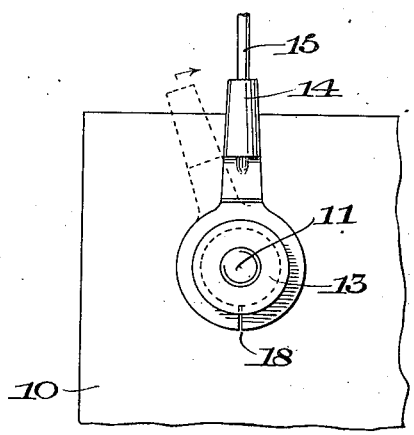
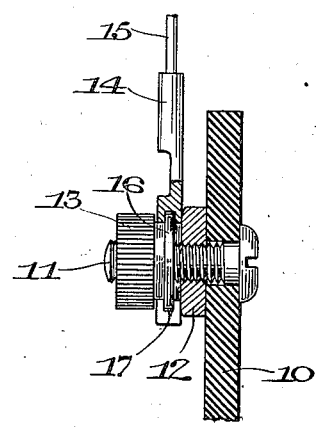
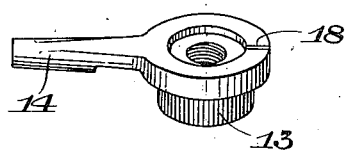

Patented June 4, 1929.

1,715,624

UNITED STATES PATENT OFFICE.

AUGUST C. REISZ, OF BARABOO, WISCONSIN, ASSIGNOR OF ONE-HALF TO RUDOLPH RASCHEFSKY, OF MILWAUKEE, WISCONSIN.

SELF-LOCKING TERMINAL CONNECTION.

Application filed August 1, 1923. Serial No. 655,047.

This invention relates to terminal connections for electrical instruments and has for its object to provide such a connection with self-locking means whereby a mechanically tight connection may be effected without the necessity for the use of tools for that purpose.

Another object of the invention is to provide such a connection which will provide a permanently assembled relation between the clamping nut and the terminal lug.

With the above and other objects in view the invention consists in the self-locking terminal connection as herein claimed and all equivalents.

Referring to the accompanying drawings, in which like characters of reference indicate the same parts in different views, Fig. 1 is a front view of a terminal connection constructed in accordance with this invention;

Fig. 2 is a side view thereof partly in section, and

Fig. 3 is a perspective view of the permanently assembled clamping nut and lug.

In these drawings, 10 indicates the baseboard of an instrument and 11 is a shouldered screw stud secured thereto in any suitable manner. As shown, the stud consists of a screw passed through an opening of the base and secured in place by a nut 12 threaded thereon and constituting the shoulder. The shouldered screw stud may, however, take any other form. Threaded on the screw stud is a clamping nut 13 having an annular flange at one end.

A lug member 14 which may constitute a solder lug for a terminal wire 15 or a clamping lug of any description has the elongated stem portion to constitute a lever handle and an internally grooved ring portion surrounding the clamping nut 13, the flange 16 of the nut fitting within the annular groove 17 of the ring portion of the lug in the manner shown in Fig. 2, whereby the two parts are permanently connected together by a swivel connection which permits the nut to turn within the lug.

The assembly of the nut within the lug may be accomplished in any desired manner as by turning one or both of the flanges of the lug in at either side of the groove after the flange of the nut is in place or by splitting the ring portion of the lug at 18 after the groove has been formed therein to permit of its being opened to receive the nut and then closed around the nut, as shown.

When the wire terminal 15 has been properly attached to the lug and it is desired to make the terminal connection with the instrument, it is only necessary to turn the nut on the screw stud by hand in the usual manner, the lever handle of the lug, however, being held slightly to the left of the final position to be assumed by it, as shown by dotted lines in Fig. 1. When the nut is as tight as it can be turned by hand a further turning thereof may be accomplished so as to lock the connection as effectively as could be done by tools by merely turning the lug a part turn by means of the lever handle thereof so as to bring said lever handle to its final position shown in full lines in Fig. 1. This causes the lower flange of the lug to be pinched between the flange of the nut and the shoulder 12 of the screw stud. The nut is caused to turn with the lug in this locking operation because the frictional resistance between its flange and the flange of the lug is greater than the frictional resistance of the nut on the screw threads of the stud. As the nut turns with the stud it is necessarily tightened further and the final clamping position thereof is such that it cannot be loosened by hand or by accident. To disconnect it it is necessary to first start it by swinging the lever handle to the left until the clamping action is released and then it may be turned freely by hand.

By means of this invention a terminal connection may be made strong and positive without loose parts liable to affect the operation of the instrument and without the possibility of the parts working loose but affording a tight low resistance connection requiring the reversal of the locking operation in order to unlock it and without necessitating the use of tools.

What I claim as new and desire to secure by Letters Patent is:

1. In a self-locking terminal connection, a screw stud having an abutment, a nut threaded thereon provided with an annular flange at its bottom edge, and a connecting lug comprising a lever handle having an internally grooved ring surrounding the flange of the nut whereby the lower wall of the groove becomes clamped between the flange and the abutment when the parts are turned by means of the lever handle.

2. In a self-locking terminal connection, a screw stud having an abutment, a nut threaded thereon provided with an annular flange, and a connecting lug comprising a lever handle having a split internally grooved ring surrounding the flange of the nut and bearing on the abutment.

3. In a self-locking terminal connection, a screw, a nut threaded thereon, a second nut threaded on the screw and provided with an annular flange, and a connecting lug comprising a lever handle adapted for connection with a wire terminal and having an internally grooved ring surrounding the flange of the second nut and bearing on the first named nut whereby the portion of the lug between the groove and one face thereof will be clamped between the flange and the nut when the lug is turned by means of the lever handle.

4. In a self-locking terminal connection, a screw stud having an abutment, a nut threaded thereon provided with an annular flange near its bottom, and a connecting lug comprising a lever handle having an internally grooved ring surrounding the flange of the nut whereby said lower wall of the groove becomes clamped between the flange and the abutment when the nut is turned by hand and thereafter causes the nut to turn with the connecting lug when the latter is used as a lever handle.

5. In a self-locking terminal connection, a screw stud having an abutment, a nut threaded thereon provided with an annular flange at its bottom, and a connecting lug comprising a lever handle having an internally grooved ring surrounding the flange of the nut whereby the upper portion of the nut is freely exposed on all sides for turning it by hand, the lower wall of the groove of the ring being directly engaged with the abutment of the screw stud and clamped between said abutment and the flange when the nut is turned by hand to thereafter constitute a driving means for the nut for causing the nut to turn further on the screw stud when the connecting lug is used as a lever handle.

In testimony whereof, I affix my signature.

AUGUST C. REISZ.